June 10, 1958     H. B. WAGNER     2,838,411
POINTING COMPOUND
Filed Nov. 15, 1955
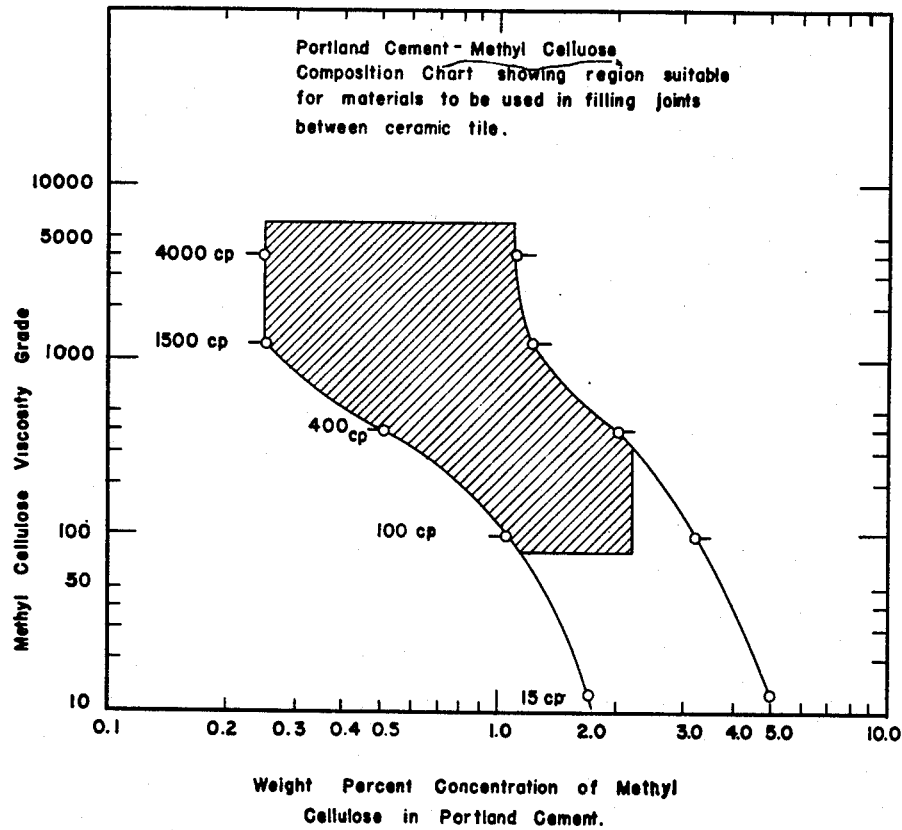
INVENTOR
HERMAN B. WAGNER
BY Diggins & LeBlanc
ATTORNEY United States Patent Office 2,838,411
Patented June 10, 1958

2,838,411

POINTING COMPOUND

Herman B. Wagner, Blooming Glen, Pa., assignor, by mesne assignments, to Tile Council of America, Inc., a corporation of New York Application November 15, 1955, Serial No. 547,026

2 Claims. (Cl. 106—93)

This invention relates to a pointing compound and more particularly relates to an improved pointing compound which may be used to fill the joints between the porous edges of ceramic tile which has been installed dry.

At the present time a large amount of ceramic wall tile is installed through the use of adhesive and the joints are filled with conventional Portland cement which requires the tile to be soaked prior to pointing and which also requires the maintenance of a certain minimum humidity for proper curing. These soaking and humidity maintenance steps require special attention, add to the labor and equipment costs, and are consequently often skipped or neglected with the result that the installation lacks hard, firm joints. While attempts have been made to fill the joints between the porous edges of ceramic tile without wetting and humidity maintenance, presently available compositions produce soft, chalky joints which crack and flake to such an extent as to render them generally unsatisfactory.

According to the present invention I have now found that these disadvantages may be overcome through the use of certain compositions of Portland cement, methyl cellulose, calcium chloride and certain other additives which are formulated to produce a pointing compound. These compositions have the property of resisting water loss to the porous tile and to the atmosphere, thus providing internal conditions necessary for proper curing. Segregation of the various materials in the composition is also prevented and a consistency is maintained which allows placement in the joint without dropping or running from the ceiling or vertical wall tile joints.

While I am aware that methyl cellulose has heretofore been used in admixture with Portland cement, this has generally been for the purpose of forming cement base paints and Portland cement hydraulic compositions for pumping into the voids and cracks of porous or honeycombed concrete masses. In the instance of the cement base paints the methyl cellulose is used primarily for its film forming characteristics, since shrinkage is no particular problem in view of the fact that it can be absorbed by contraction perpendicular to the painted surface. Large proportions of water are necessary to obtain the desired workability and brushing characteristics and low viscosity types of methyl cellulose have generally been preferred.

In the Portland cement hydraulic compositions, the methyl cellulose is used primarily as a lubricating agent to provide the proper flowability to permit pumping of the slurry into porous concrete structures or masses without packing and plugging of hose lines and voids and interstices to be filled. In addition, the methyl cellulose is utilized to maintain the solids in the composition in a state of suspension as the rate of travel of the slurry through the voids and interstices of the porous mass becomes slow. Low viscosity type methyl cellulose is again preferred and a relatively large proportion of water is utilized.

Neither of these compositions, however, is suitable as a pointing compound. The cement base paint is obviously too thin and is subject to a shrinkage which renders it completely unsatisfactory in such an application. Nor are these difficulties eliminated through the use of a smaller amount of water, since the low viscosity methyl cellulose preferred in the paints is incapable of forming a satisfactory pointing compound when mixed with any proportion of water. The hydraulic cement is also too fluid to form a pointing compound. Further, the low viscosity and small amount of methyl cellulose used and the large percentage of water makes the compound subject to flaking and cracking, problems not encountered when it is used as a hydraulic filling compound which is totally enclosed by the aggregate or cement to be filled. Reduction in the proportion of water utilized is unsatisfactory in this instance also, since the low viscosity methyl cellulose utilized cannot solve the pointing compound problems regardless of the amount of water utilized.

It is accordingly a primary object of the present invention to provide an improved pointing compound utilizing Portland cement and methyl cellulose.

It is another object of the present invention to provide a novel and improved pointing compound comprising Portland cement, methyl cellulose and calcium chloride.

It is another object of this invention to provide an improved pointing compound which may be used to fill the joint between the porous edges of ceramic tile which has been installed dry and which is not wet with water prior to pointing.

It is another object of this invention to provide an improved pointing compound of the foregoing type which has the property of curing in a dry atmosphere.

Further objects and advantages of the invention will become apparent upon reference to the following description and claims and the appended drawing which comprises a graph depicting compositions of methyl cellulose and Portland cement which are satisfactory as for use in pointing compounds.

I have discovered that an admixture of Portland cement and medium to high viscosity methyl cellulose in certain proportions when mixed with 30 to 40% water based upon the weight of the dry cement forms a superior pointing compound for filling joints between dry tiles. This compound has the property of resisting water loss to the porous tile and to the atmosphere and thus provides internal conditions necessary for proper curing. Segregation is also prevented and a consistency is maintained which allows placement in the joint without dropping or running from ceiling or vertical wall tile joints.

The mechanism whereby loss of water to the tile pores is prevented involves an increase of viscosity of the water phase brought about by the methyl cellulose which is dissolved therein. This substantial viscosity increase prevents or greatly retards water flow into the pores of the tile body and, in addition to this effect, diffusion of water from the inner portion of the joint to the surface is diminished and a water impeding film is formed at the joint compound-air interface.

The amount of methyl cellulose and water to be used in order to produce a satisfactory pointing compound, that is, a compound having a proper balance between consistency, water loss, workability, setting time and water sensitivity of the final joint, is dependent upon the viscosity grade of methyl cellulose employed in the composition. As an example, 1.5% of a methyl cellulose having a viscosity of 4,000 centipoise in a 2% solution would require so much water in order to obtain a practical consistency and workability that it would produce a pointing compound susceptible to considerable shrinkage and cracking. While such a composition might well be satisfactory in a paint where film formation is important and where shrinkage may be absorbed by contraction perpendicular to the painted surface, it would be entirely unsatisfactory as a pointing compound.

If too large an amount of methyl cellulose is used the water sensitivity of the joint produced is too great and curing time is too long. On the other hand, too small an amount of methyl cellulose will not produce a material usable under dry conditions of application to ceramic tile and masonry. I have found that the relationship of the amount and viscosity of the methyl cellulose and of the amount of water is critical and that all of the acceptable dry joint filling compositions lie within the shaded area defined by the graph shown in the drawing. Reference to this graph will show that low viscosity type methyl cellulose, that is, methyl cellulose having a viscosity less than approximately 80 centipoise in a 2% solution, is unsatisfactory in a pointing compound as is an amount of methyl cellulose in excess of approximately 2.2%. The upper limit of viscosity is approximately 6,000 centipoise in a 2% solution while the lower limit on the amount of methyl cellulose is approximately 0.25%. The amount of water necessary to form a satisfactory pointing compound is also critical and lies between approximately 30 and 40% based upon the dry weight of the Portland cement.

In addition to the Portland cement and methyl cellulose it is also desirable to use a hardening accelerator such as calcium chloride which causes hardening within a satisfactory period of time, as, for instance, within a period of approximately two to three hours. Excessive calcium chloride must not be used, however, since this causes the composition to set up too rapidly, causes the formation of undesired soluble salts and reduces the strength of the material. I have found that no more than approximately 2.5% calcium chloride may be used and that the preferred amount is approximately 1.5 to 2.0%.

*Example 1*

The following mixture:

97.75% white Portland cement
0.75% 4000 centipoise viscosity grade methyl cellulose
1.5% calcium chloride
0.01% powdered aluminum metal stirred into 35% of its weight of water gave a pointing compound sufficiently fluid so that it could be manually rubbed into the dry tile joints, which were spaced from 1/32" to 9/32", yet viscous enough so that running from either ceiling or vertical wall was not encountered. Upon curing in either moist or dry atmosphere, a hard, crack free joint was obtained which is not swollen or severely impaired in its properties upon prolonged exposure to either cold or hot water. The function of the aluminum powder is to compensate for the small amount of shrinkage that would otherwise be obtained through reaction with hydroxide ions derived from the cement to produce hydrogen gas.

*Example 2*

The mixture:

93.75% white Portland cement
1.25% 400 centipoise viscosity grade methyl cellulose
2.0% calcium chloride
0.01% powdered aluminum metal
3.0% titanium dioxide pigment stirred into 35% of its weight of water gave a pointing compound of similar performance.

*Example 3*

The mixture:

93.5% white Portland cement
1.5% 100 centipoise viscosity grade methyl cellulose
2.0% calcium chloride
0.01% powdered aluminum metal
3.0% titanium dioxide pigment stirred in to 35% of its weight of water gave a similar performance.

While the pointing compound of this invention is valuable primarily because of its ability to form satisfactory joints between ceramic tiles which have been installed dry and which are not wet with water prior to pointing, it may also be advantageously utilized under wet conditions.

The invention may be embodied in other specific forms without departing from the spirit or essential characteristics thereof. The illustrated compositions are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pointing composition consisting essentially of a mixture of the following ingredients in percentages by weight: in excess of about 90% Portland cement, about 0.25 to 2.2% methyl cellulose which has a viscosity in 2% solution of 80–6,000 centipoise, and about 1.5 to 2.5% calcium chloride; and about 30–40% water based on the weight of said mixture including the previously named ingredients to form a paste capable of pointing ceramic tile.

2. A pointing composition consisting essentially of a mixture of the following ingredients in percentages by weight: in excess of about 90% Portland cement, methyl cellulose in an amount and having a viscosity falling within the shaded area of the graph in the drawing, about 1.5 to 2.5% calcium chloride; and about 30–40% water based on the weight of said mixture including the previously named ingredients to form a paste capable of pointing ceramic tile.

References Cited in the file of this patent
UNITED STATES PATENTS 2,600,018   Nelson et al. _____ June 10, 1952